US005355526A

United States Patent [19]

Berninger

[11] Patent Number: 5,355,526

[45] Date of Patent: Oct. 11, 1994

[54] METHOD FOR THE FIELD STRENGTH DEPENDENT ANALYSIS OF RADIO INFORMATION FOR VEHICLES

[75] Inventor: Harald Berninger, Ruesselsheim, Fed. Rep. of Germany

[73] Assignee: General Motors Corporation, Detroit, Mich.

[21] Appl. No.: 973,998

[22] Filed: Nov. 10, 1992

[30] Foreign Application Priority Data

Nov. 11, 1991 [DE] Fed. Rep. of Germany ....... 4137000

[51] Int. Cl.[5] .............................................. H04B 17/02

[52] U.S. Cl. .............................. 455/161.2; 455/161.3; 455/185.1; 455/186.1

[58] Field of Search ............... 455/161.1, 161.2, 161.3, 455/154.1, 154.2, 152.1, 166.1, 166.2, 186.1, 185.1, 33.1; 340/992, 995

[56] References Cited

U.S. PATENT DOCUMENTS 5,220,682 6/1993 Tomohiro ........................ 455/161.2

FOREIGN PATENT DOCUMENTS 4005413 8/1991 Fed. Rep. of Germany ... 455/186.1

44929 2/1990 Japan .................................. 455/33.1

*Primary Examiner*—Edward F. Urban

*Assistant Examiner*—Thanh C. Le

*Attorney, Agent, or Firm*—Anthony Luke Simon; Mark A. Navarre

[57] ABSTRACT

The invention pertains to a method for the field strength-dependent analysis of radio information for vehicles with a radio receiver unit (I), comprising a scanner-receiver (1), which supplies a radio data signal (RDS) as an identification sign for a specific transmission program through a radio data signal program identification decoder (3). The currently received field strength appears at the output of an analog-to-digital converter (4), and the currently received frequency (f) is measured by a frequency counter (5). The scanner-receiver (1) is periodically scanned, and the RDS sign, field strength (FS) and frequency (f) are linked in a microcomputer unit (II) for identification of the received transmitters and for assignment of the received field strength to the corresponding transmitter. This assignment is used to form current field-strength profile, which depends on the receiving location. In the arithmetic-logic unit (9) of the microcomputer system (II), the current field-strength profile is compared with reference field-strength profiles from a reference memory (8, 11). When they are the same, an output unit (10) is supplied with the information that is assigned to the reference field-strength profile.

11 Claims, 2 Drawing Sheets

METHOD FOR THE FIELD STRENGTH DEPENDENT ANALYSIS OF RADIO INFORMATION FOR VEHICLES

The invention pertains to a method for the field strength-dependent analysis of radio information for vehicles with a radio receiver unit, comprising a scanner-receiver, which supplies the intermediate frequency with the data signal to a frequency demodulator, which is connected to a radio data signal program identification decoder, at whose output a radio data signal (RDS) appears as an identification sign for a specific transmission program. The currently received field strength appears at the output of an analog-to-digital converter, which is connected with the scanner-receiver, and the currently received frequency appears at the output of a frequency counter, which is connected with the scanner-receiver.

BACKGROUND OF THE INVENTION

Radio transmissions, especially frequency-modulated (FM) radio transmissions in the ultra-shortwave region, are already being transmitted with an RDS signal by almost all transmitters. The RDS signal causes the program name (e.g., SWF3 as an abbreviation for Südwestfunk, Program 3) to appear in clear text on the display of a radio receiver. This is transmitted in a maximum of 8 ASCII characters, but is the same for all transmitter locations of the given program, i.e., the transmitter location (antenna) is not transmitted.

In addition, it is well known that a transmitter's field strength decreases hyperbolically, i.e., nonlinearly, with increasing distance from the transmitter.

For vehicles, especially motor vehicles, location position determination is becoming increasingly important for the purpose of making a direct determination of the location, when, for example, an accident site needs to be reported to a rescue station, or, in international freight traffic, the present position of a truck needs to be reported to the truck fleet management control center. On the other hand, indirect position determination is necessary in certain situations, e.g., when from among a large number of traffic messages, it is necessary to select only those messages that are relevant to the present position of the vehicle. ARI radio traffic messages are presently still being given in spoken form, but in the future they will be permanently transmitted as inaudible digital "radio data system/traffic message channel" signals (RDS/TMC signals). In this regard, it can be expected that the number of radio traffic messages will continue to increase, so that a selection of incoming radio traffic messages seems absolutely necessary, and this selection can be made, e.g., indirectly by a position determination.

One well-known method of position determination is the Global Positioning System (GPS). This system requires special receivers and about 24 satellites in orbit, which is a very expensive method. Another method makes position determinations by measuring the travel time of radio signals with a) synchronized radio transmitters, which requires the conversion of many transmitters, b) nonsynchronous radio transmitters, which requires precise distance determination.

Methods a) and b) both require high-quality measuring technology for measuring the travel time. Another well-known method is the dead-reckoning navigational system, but this is very expensive.

DE-OS38 37 633 describes a location and navigation system for mobile radio stations, which frees the driver from searching for the right map section. Location information corresponding to the approximate position of the vehicle is developed from information exchanged between mobile radio stations and stationary radio stations, and then this location information is used to automatically select the relevant map section.

SUMMARY OF THE INVENTION

The goal of the present invention was to develop a method of using a radio receiving unit to analyze position-related or position-dependent radio information as a function of the location of the vehicle.

In accordance with the invention, this goal is achieved by periodically scanning with the scanner-receiver, then linking the radio data signal (RDS), field strength and frequency in a microcomputer unit with an electronic control unit for identification of the transmitters whose signals are being received and for assignment of the received field strength to the corresponding transmitter, by using this assignment to form a current field-strength profile for the transmitters in the electronic control unit, dependent on the receiving location, which field-strength profile is characterized by codes of the identified transmitters and an ordering of these codes according to the magnitude of the received field strengths to form ordered sequences, and, finally, by comparing reference field-strength profiles, which are characterized by ordered reference sequences and stored in a reference memory of the microcomputer unit, with the current field-strength profile in the arithmetic-logic unit of the microcomputer system, and if they are the same, supplying an output unit with information assigned to the reference field-strength profile in the reference memory.

The invention further proposes that the information assigned to the reference field-strength profile be supplied to an output unit, which can be a visual display or a speech synthesis module connected to a loudspeaker, and that the driver of the vehicle be able to read or hear this information continually.

In a first variation, the reference memory is a read-only memory, in which relevant reference field-strength profiles are stored, which are representative for geographic regions, such that these ordered reference sequences have the function of memory location addresses, whose memory content is information in the form of degrees of geographic latitude and longitude, which is assigned to the given reference sequence. In this way the driver learns his present position.

In a second variation, the reference memory is a read-write memory, whose input is connected to the output of a radio data signal/traffic message channel decoder (RDS/TMC decoder), which is connected to a traffic radio receiver, whose received coded traffic information is decoded and translated in the RDS/TMC decoder, such that each piece of information produced in this way in the RDS/TMC decoder is assigned one or more relevant reference field-strength profiles selected from a read-only memory, which functions as a translation list, and is then stored in the reference memory, such that these reference sequences or reference field-strength profiles function as memory location addresses, whose memory content represents the assigned information. The relevant reference field-strength profile or profiles are assigned as a function of the type of traffic information by means of location data from the read-only memory of the RDS/TMC decoder.;

The process of the invention has the important advantage that conventional radio transmitters can be used, which is not possible in a process that utilizes measurement of the travel time, since in this case transmitter synchronization is necessary, or, when nonsynchronous radio transmitters are used, precise distance measurements are necessary, which is expensive.;

Other advantageous designs of the invention are specified in the subclaims.

Specific examples of the invention are illustrated in the drawings.

BRIEF DESCRIPTION OF THE INVENTION

Figure 1:
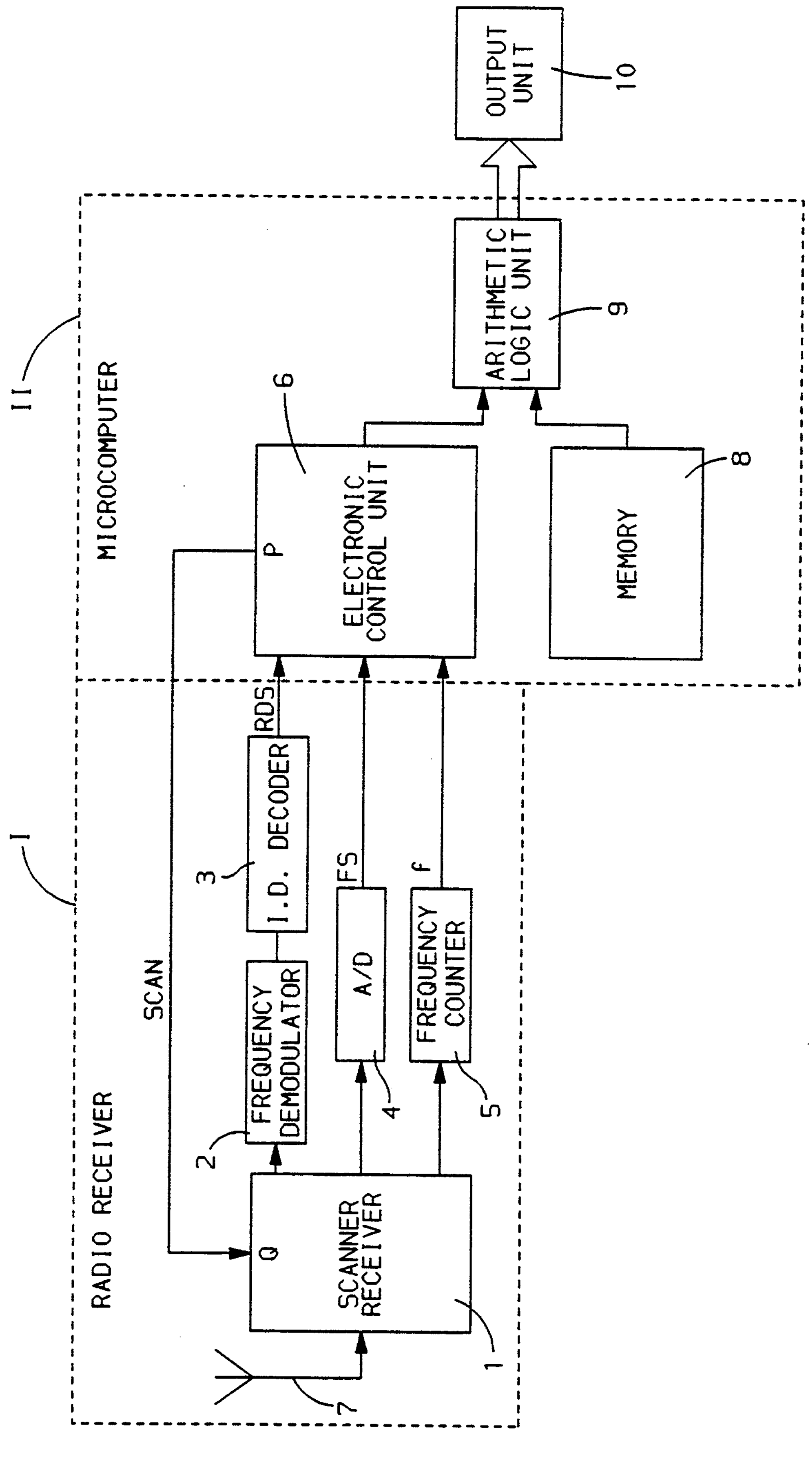
FIG. 1 shows a block diagram for realizing the first variation of the method.

The block diagram shown in FIG. 1 starts from radio receiver unit I, which consists of the scanner-receiver 1, which receives transmitted radio signals through the antenna 7. The intermediate frequency with the data signal appears at one of its outputs and is supplied to the frequency demodulator 2. The frequency demodulator 2 is connected to the radio data signal program identification decoder 3, at whose output the radio data signal RDS appears as an identification sign for a specific transmission program, for example HR3 for Hessicher Rundfunk, Program 3, for subsequent processing. The currently received field strength FS appears at the output of the analog-to-digital converter 4, which is connection to a second output of the scanner-receiver 1. The currently received frequency f appears at a third output of the scanner-receiver 1. This frequency is measured by the frequency counter 5 and is ready for further processing. In accordance with the invention, the scanner-receiver 1 is periodically scanned via an electronic control unit 6, and the return line (scan) runs from the output P of the electronic control unit 6 to the input Q of the scanner-receiver. The radio data signal RDS, field strength FS and frequency f are linked in the microcomputer unit II with the electronic control unit 6.

In the first step, the frequency f and the RDS symbol are used to determine the location of the given transmitter. For example, the Vogelsberg transmitter in Hesse can be identified from the frequency 89.3 kHz and the RDS symbol HR3. In the second step, the received field strength FS is assigned to these transmitters. The purpose of this is to form so-called field-strength profiles, which are characterized by codes of the identified transmitters and an ordering of these codes according to the size of the received field strength. For example, the following transmitters are received:

Vogelsberg with the code VB and a field strength of 3 $\mu$V/cm,

Donnersberg with the code DB and a field strength of 2 $\mu$V/cm,

Feldberg with the code FB and a field strength of 1 $\mu$V/cm.

By ordering these transmitters according to the magnitude of the received field strength, we thus obtain a current field-strength profile, or in mathematical terminology, an ordered sequence of the form (VB>DB>FB).

Relevant reference field-strength profiles representative of geographic regions are stored in a reference memory 8 of the microcomputer unit II. Reference memory 8 is a read-only memory.

These ordered reference sequences or reference field-strength profiles function as memory location addresses, whose memory content represents information about degrees of latitude and longitude assigned to the given ordered sequence.

In the arithmetic-logic unit 9 of the microcomputer system II, the current field-strength profile is then compared with the reference field-strength profiles of the reference memory 8, and, when they are the same, the information assigned to the reference field-strength profile that was recognized as being the same is sent to the output unit 10, which can be a visual display and/or a speech synthesis module with a loudspeaker. The driver of the vehicle thus obtains continuous information about his present location.

Figure 2:
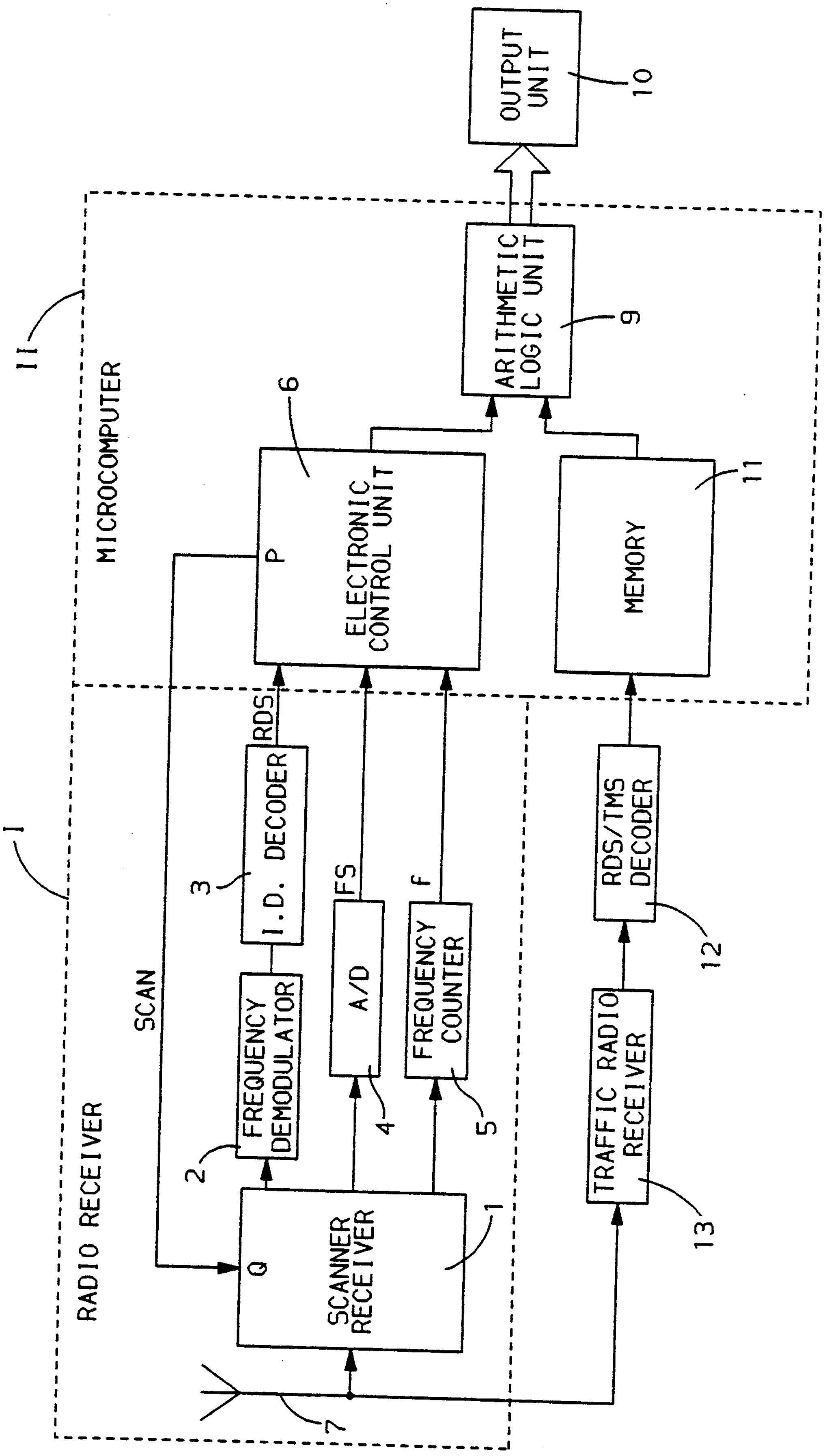
FIG. 2 shows a block diagram for realizing the second variation of the method.

The block diagram in FIG. 2 for realizing the second variation again contains a radio receiving unit I, which is identical to the unit in FIG. 1. The microcomputer unit II is also almost identical to the unit in FIG. 1. The only difference is that the reference memory 11 in FIG. 2 is a read-write memory. Its input is connected to the output of a radio data signal/traffic message channel decoder (RDS/TMC decoder) 12, which is connected with a traffic radio receiver 13. This continuously receives coded traffic information through the antenna 7 at a constant frequency. This information consists of specific location information and general information. According to the tentative standarization proposal of the RDS ALERT Consortium, the location data of the RDS/TMC traffic information are transmitted in 16-bit coded form. These data are decoded and translated in the RDS/TMC decoder 12 by a translation list, which can be realized as a read-only memory. One or more relevant reference field-strength profiles selected from this translation list or from the read-only memory of the RDS/TMC decoder 12 are assigned to each piece of information produced in this way and stored in the reference memory 11. Here again, the reference ordered sequences or reference field-strength profiles function as memory location addresses, whose memory content represents the assigned traffic information with location data. The assignment of the relevant reference field-strength profile(s) is made according to the type of traffic information by means of the specific location data from the read-only memory of the RDS/TMC decoder 12.

The following example will help explain this better. Consider, for example, the transmitted code 1101/0111/0110/1111= "Frankfurt Junction, traffic backed up for 5 km..." Assigned field-strength profiles from the read-only memory, by the information "Frankfurt Junction": (VB>DB>FB) and (EB>HK>FB) with VB—transmitter 1,
DB—transmitter 2,
FB—transmitter 3,
EB—transmitter 4,
HK—transmitter 5.

Let us assume that the field-strength profile currently received by the scanner-receiver 1 is (VB>DB>FB). In the arithmetic-logic unit 9, it is determined that the current field-strength profile (VB>DB>FB) is the same as the field-strength profile (VB>DB>FB) assigned to the traffic information "Frankfurt Junction, traffic backed up for 5 km...", and this traffic information is output in the output unit 10. This can again be a visual display and/or a speech synthesis module. This method makes it possible, for example, to transmit permanent and updated traffic information over the transmission area of a whole state or even beyond it. This information includes all location data at which traffic problems presently exist. However, the vehicle driver receives only the information that is relevant to the region in which he is presently located.

In accordance with the invention, a discrete number n of the identified transmitters, whose field strength is greater than an absolute or relative reference field strength, is used to form the current field-strength profiles.

From the discrete number n, a constant number K of the strongest identifiable transmitters in the order of their field strength form the current field-strength profile in the form of an ordered sequence. The constant number K is preferably three.

Before being used for analysis in the arithmetic-logic unit 9 of the microprocessor system II, the received field-strength profiles are subjected to an averaging method with a certain averaging period.;

I claim:

1. In a vehicle with a radio receiver unit comprising a scanner-receiver, a frequency demodulator, a radio data signal program identification coder, an analog-to-digital converter, and a frequency counter, wherein the scanner-receiver supplies an intermediate frequency signal comprising a data signal to the frequency demodulator, wherein the frequency demodulator has an output coupled to the radio data signal program identification coder, wherein responsive to the frequency demodulator output, the radio data signal program identification coder outputs a radio data signal comprising an identification sign for a specific transmission program, wherein the analog-to-digital converter is coupled to the scanner-receiver and outputs a currently received field-strength signal responsive to the scanner receiver, and wherein the frequency counter is coupled to the scanner receiver and outputs a currently received frequency signal responsive to the scanner-receiver, a method for field-strength-dependent analysis of radio information comprising the steps of:

storing a plurality of reference field-strength profiles in a memory of a microcomputer unit, each reference profile having a corresponding information data;

periodically scanning the scanner-receiver to obtain (i) a radio data signal, (ii) a field-strength signal, and (iii) a frequency signal for a plurality of received radio signals, each received radio signal transmitted from a different radio transmitter;

coupling the radio data signals, field-strength signals and frequency signals to the microcomputer unit, wherein the microcomputer unit includes an electronic control unit;

responsive to the radio data signal, identifying the radio transmitters transmitting the received radio signals;

responsive to each field-strength signal, assigning a received field-strength value to the corresponding identified radio transmitter;

forming in the electronic control unit, a current field-strength profile for the identified radio transmitters dependent on a receiving location, according to the sub-steps of (i) coding the identified transmitters, and (ii) ordering the codes according to a magnitude of the assigned received field-strength values to form ordered sequences;

storing the current field-strength profile in the memory of the microcomputer unit;

comparing the current field-strength profile to each of the reference field-strength profiles; and responsive to the comparison, outputting the data information corresponding to the reference field-strength profile that is equal to the current field-strength profile.

2. The method of claim 1, wherein a visual display is used to output the data information.

3. The method of claim 1, wherein a speech synthesis module with a loudspeaker is used to output the data information.

4. The method of claim 1, also comprising the step of firs selecting a discrete number of the identified transmitters having field-strength values greater than one reference of: (i) an absolute field-strength reference and (ii) a relative field-strength reference, wherein the step of forming the current field-strength profiles responsive to the first selected identified transmitters.

5. The method of claim 4, comprising the step of second selecting, from the first selected identified transmitters, a constant number of identifiable transmitters having field-strength values greater than the remaining first selected identified transmitters, wherein the second selection is in the order of the field-strength values, wherein the current field-strength profile is formed responsive to the second selected identified transmitters.

6. The method of claim 5, wherein the constant number is three.

7. The method of claim 1, also comprising the step of averaging the current field-strength profiles over a predetermined averaging period.

8. The method of claim 1, wherein the memory is a read-only memory, in which relevant reference field-strength profiles are stored and are representative of geographic regions, and wherein the reference field-strength profiles comprise memory location addresses of memory storing information in a form of degrees of a geographic latitude and a geographic longitude assigned to the given reference field-strength profile ordered sequence.

9. The method of claim 1, wherein the memory is a read-write memory, having an input coupled to an output of a radio data signal/traffic message channel decoder, wherein the radio data signal/traffic message channel decoder is connected to a traffic radio receiver having an output providing a received coded traffic information consisting of specific location data and general information, wherein the radio data signal traffic message channel decoder decodes and translates the received coded traffic information, wherein the method also comprises the step of assigning the decoded and translated information at least one relevant reference field-strength profile selected from the read-only memory of the radio data system/traffic message channel decoder, wherein the reference field-strength profiles comprises memory location addresses of memory storing assigned information.

10. The method of claim 9, comprising the step of, responsive to the assigned information, assigning the reference field-strength profiles as function of traffic information type by a specific location data from the read-only memory of the radio data system/traffic message channel decoder.

11. In a vehicle with a radio receiver unit comprising (i) a scanner-receiver for supplying an intermediate frequency signal comprising a data signal, (ii) a frequency demodulator coupled to the scanner-receiver and receiving the intermediate frequency signal, (iii) a radio data signal program identification coder coupled to an output of the frequency demodulator, wherein responsive to the frequency demodulator output, the radio data signal program identification coder outputs a radio data signal comprising an identification sign for a specific transmission program, (iv) an analog-to-digital converter coupled to the scanner-receiver and, responsive thereto, outputting a currently received field-strength signal, and (v) a frequency counter, coupled to the scanner receiver and outputting a currently received frequency signal responsive to the scanner-receiver, a method for field-strength-dependent analysis of radio information comprising the steps of:

storing a plurality of reference field-strength profiles, each reference profile having a corresponding information data;

periodically scanning the scanner-receiver to obtain (i) a radio data signal, (ii) a field-strength signal, and (iii) a frequency signal for a plurality of received radio signals, each received radio signal transmitted from a different radio transmitter;

forming a current field-strength profile for the identified radio transmitters dependent on a receiving location;

comparing the current field-strength profile to each of the reference field-strength profiles; and responsive to the comparison, outputting the data information corresponding to the reference field-strength profile that is equal to the current field-strength profile, wherein the output data information is received by a vehicle operator and comprises traffic information relevant only to the region in which the vehicle is presently located.

* * * * *